(12) United States Patent
Knadle, Jr. et al.

(10) Patent No.: US 7,423,606 B2
(45) Date of Patent: Sep. 9, 2008

(54) MULTI-FREQUENCY RFID APPARATUS AND METHODS OF READING RFID TAGS

(75) Inventors: Richard T. Knadle, Jr., Dix Hills, NY (US); Hal Charych, E. Setauket, NY (US); Mark William Duron, East Patchogue, NY (US); Raj Bridgelall, Morgan Hill, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 439 days.

(21) Appl. No.: 10/957,529

(22) Filed: Sep. 30, 2004

(65) Prior Publication Data

US 2006/0066441 A1 Mar. 30, 2006

(51) Int. Cl.
*H01Q 5/02* (2006.01)
*H04Q 5/22* (2006.01)

(52) U.S. Cl. .................. 343/819; 343/833; 235/462.46; 340/10.1

(58) Field of Classification Search .......... 343/702, 343/795, 853, 742, 867, 770, 819, 833; 340/572.7, 340/10.1; 235/462.46
See application file for complete search history.

(56) References Cited

U.S. PATENT DOCUMENTS

| 4,028,709 | A |   | 6/1977  | Berkowitz et al.       |
|-----------|---|---|---------|------------------------|
| 4,218,686 | A |   | 8/1980  | Blonder                |
| 4,336,543 | A |   | 6/1982  | Ganz et al.            |
| 4,373,163 | A | * | 2/1983  | Vandebult ...... 343/842 |
| 4,700,197 | A |   | 10/1987 | Milne                  |
| 5,061,941 | A | * | 10/1991 | Lizzi et al. ...... 343/742 |
| 5,220,335 | A |   | 6/1993  | Huang                  |
| 5,493,704 | A |   | 2/1996  | Grangeat et al.        |

(Continued)

FOREIGN PATENT DOCUMENTS

EP  0598624 A  5/1994

(Continued)

OTHER PUBLICATIONS

Deal, William R. et al., A Now Quasi-Yagi Antenna For Planar Active Antenna Arrays, IEEE Transactions on Microwave Theory and Techniques, IEEE Inc., New York, US, vol. 48, No. 6, Jun. 2000 pp. 910-918.

(Continued)

*Primary Examiner*—Michael C Wimer
(74) *Attorney, Agent, or Firm*—Ingrassia Fisher & Lorenz, P.C.

(57) ABSTRACT

A portable/handheld device is provided having a processing module configured to selectively operate a reading mode selected from a far-field mode and a near-field mode, and a directional antenna array coupled to the processing module. The directional antenna array includes a first antenna element configured to radiate electromagnetic (EM) radiation in a far-field, and a second antenna element coupled to the first antenna element. The second antenna element is configured to radiate EM radiation in a near-field. The second antenna element includes an antenna transducer configured to selectively cancel far-field EM radiation from the first antenna element. A method of reading inductively coupled radio frequency identification (RFID) tags is also provided having the steps of scanning at least one frequency band to detect a RFID tag, and selectively radiating one of a near-field electromagnetic (EM) field and a far-field EM field based on the detected RFID tag.

30 Claims, 11 Drawing Sheets

U.S. PATENT DOCUMENTS

| | | |
|---|---|---|
| 5,612,706 A | 3/1997 | Podell |
| D385,563 S | 10/1997 | Podell |
| 5,712,643 A | 1/1998 | Skladany |
| 5,748,156 A | 5/1998 | Weber |
| 5,877,728 A * | 3/1999 | Wu et al. .................... 343/742 |
| 5,898,410 A | 4/1999 | DeMarre |
| 5,913,549 A | 6/1999 | Skladany |
| 5,914,692 A * | 6/1999 | Bowers et al. .............. 343/742 |
| 6,061,036 A | 5/2000 | MacDonald et al. |
| 6,069,564 A | 5/2000 | Hatano et al. |
| 6,127,928 A | 10/2000 | Issacman et al. |
| 6,229,491 B1 | 5/2001 | Bolden et al. |
| 6,307,524 B1 | 10/2001 | Britain |
| 6,326,922 B1 | 12/2001 | Hegendoerfer |
| 6,353,406 B1 | 3/2002 | Lanzl et al. |
| 6,445,297 B1 | 9/2002 | Nicholson |
| 6,483,476 B2 | 11/2002 | Cox |
| 6,617,962 B1 | 9/2003 | Horwitz et al. |
| 6,809,699 B2 | 10/2004 | Chen et al. |
| 6,922,173 B2 * | 7/2005 | Anderson .................... 343/701 |
| 2002/0105473 A1 | 8/2002 | Cox |
| 2002/0139822 A1 | 10/2002 | Infanti |
| 2003/0125725 A1 | 7/2003 | Woodard et al. |
| 2003/0160730 A1 | 8/2003 | Alsliety |

FOREIGN PATENT DOCUMENTS

| | | |
|---|---|---|
| EP | 0 718 912 A1 | 6/1996 |
| EP | 1209615 A | 5/2002 |
| GB | 2 393 076 A | 3/2004 |
| JP | 10 032418 A | 7/1996 |
| JP | 2000 322545 A | 11/2000 |
| JP | 2001109853 | 4/2001 |
| WO | 9837596 A | 8/1998 |
| WO | WO/98/37596 A | 8/1998 |
| WO | 2004015625 A | 2/2004 |
| WO | WO/2004/015625 A | 2/2004 |
| WO | PCT/US2005/034356 | 1/2006 |

\* cited by examiner

MULTI-FREQUENCY RFID APPARATUS AND METHODS OF READING RFID TAGS

TECHNICAL FIELD

The present invention generally relates to a multi-frequency antenna, and more particularly relates to a directional antenna array for radio frequency identification (RFID).

BACKGROUND

Yagi-Uda antennas were originally described in the English language in an article written by H. Yagi (See H. Yagi, "Beam Transmission of the Ultra Short Waves," Proc. IRE. Vol. 16, pp. 715-741, June 1928). These directional dipole antennas, which are commonly referred to as Yagi antennas, have been used for many years and in many applications. For example, the Yagi antenna has been used for reception of television signals, point-to-point communications and other electronics applications.

The basic Yagi antenna typically includes a driven element, usually a half-wave dipole, which is driven from a source of electromagnetic energy or drives a sink of electromagnetic energy. The antenna also typically includes non-driven or parasitic elements that are arrayed with the driven element. These non-driven or parasitic elements generally comprise a reflector element on one side of the driven element and at least one director element on the other side of the driven element (i.e., the driven element is interposed between the reflector element and the director element). The driven element, reflector element and director element are usually positioned in a spaced relationship along an antenna axis with the director element or elements extending in a transmission or reception direction from the driven element. The length of the driven, reflector and director elements and the separations between these antenna elements specify the maximum Effective Isotropic Radiated Power (EIRP) of the antenna system (i.e., directive gain) in the antenna system's bore site direction.

Current trends in antenna designs reflect the desirability of low profile, directional antenna configurations that can conform to any number of shapes for a mobile or portable unit while providing highly directional antenna patterns, such as those achievable with the Yagi antenna. In addition, current trends in antenna designs reflect the desirability of the antenna to maintain structural shape and integrity after application of an external force, such as a surface impact. Such antenna designs are particularly desirable in portable or handheld devices such as cellular telephones, satellite telephones and contactless interrogators of Automatic Identification (Auto ID) systems, such as Radio Frequency Identification (RFID) interrogators of RFID systems.

RFID systems may include different tags with various frequency range response. For example, some RFID tags may be categorized as near-field tags or far-field tags based on a corresponding frequency designation for such tags. Additionally, RFID tags may operate in different frequencies. One design consideration for RFID systems is that an RFID antenna used for reading such tags generally has satisfactory reading operation when the antenna size is physically large. Another design consideration for RFID systems is that with hand-held and hands-free RFID readers incorporating RFID antennas, a minimized antenna size is generally desired for portability. An additional concern is that a closer proximity of the RFID antenna to a part of a human body tends to degrade performance of the antenna.

Accordingly, it is desirable to provide a multi-frequency, low profile, directional antenna having highly directional antenna patterns. In addition, it is desirable to provide a multi-frequency, directional antenna having near-field and far-field elements while maintaining a relatively compact size. Furthermore, it is desirable to provide such an antenna for portable or hand-held devices that has low detuning sensitivity from user proximity. Moreover, desirable features and characteristics of the present invention will become apparent from the subsequent detailed description and the appended claims, taken in conjunction with the accompanying drawings and the foregoing technical field and background.

BRIEF SUMMARY

According to various exemplary embodiments, a portable/handheld device for radio frequency identification (RFID) and methods of reading inductively coupled radio frequency identification (RFID) tags are provided. In one exemplary embodiment, a portable/handheld device includes a processing module configured to selectively operate a reading mode selected from a far-field mode and a near-field mode, and a directional antenna array coupled to the processing module. The directional antenna array includes a first antenna element configured to radiate electromagnetic (EM) radiation in a far-field, and a second antenna element coupled to the first antenna element. The second antenna element is configured to radiate EM radiation in a near-field and includes an antenna transducer configured to selectively cancel far-field EM radiation from the first antenna element.

In a second exemplary embodiment, a multi-frequency radio frequency identification (RFID) device is provided having a processor configured to scan frequency bands for RFID tags and select a reading mode frequency band based on the scanned frequency bands, a switch coupled to the processor, a first antenna element coupled to the processor, and a second antenna element coupled to the first antenna element. The switch is configured to select at least one reading mode frequency band. The first antenna element is configured to radiate electromagnetic (EM) radiation in a far-field. The second antenna element is configured to radiate EM radiation in a near-field and includes an antenna transducer configured to selectively cancel far-field EM radiation from the first antenna element. One of the first antenna element and the second antenna element is further configured to resonate at the at least one reading mode frequency band.

In a third exemplary embodiment, a method of reading inductively coupled radio frequency identification (RFID) tags is also provided having the steps of scanning at least one frequency band to detect a RFID tag, and selectively radiating an electromagnetic (EM) field of at least one of a near-field EM field and a far-field EM field based on the detected RFID tag.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
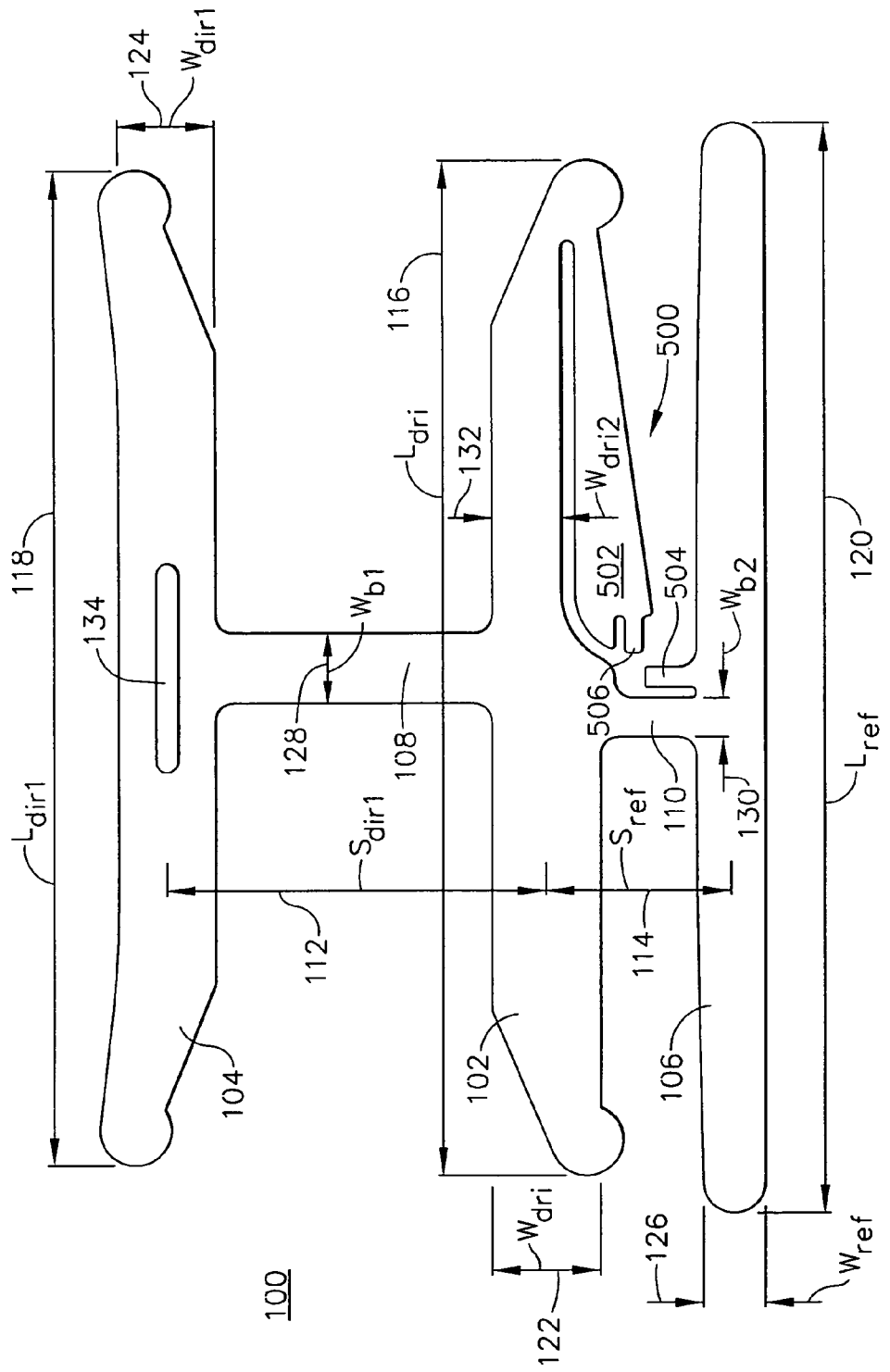
FIG. 1 a planar view of a directional antenna array in accordance with an exemplary embodiment of the present invention.
Figure 2:
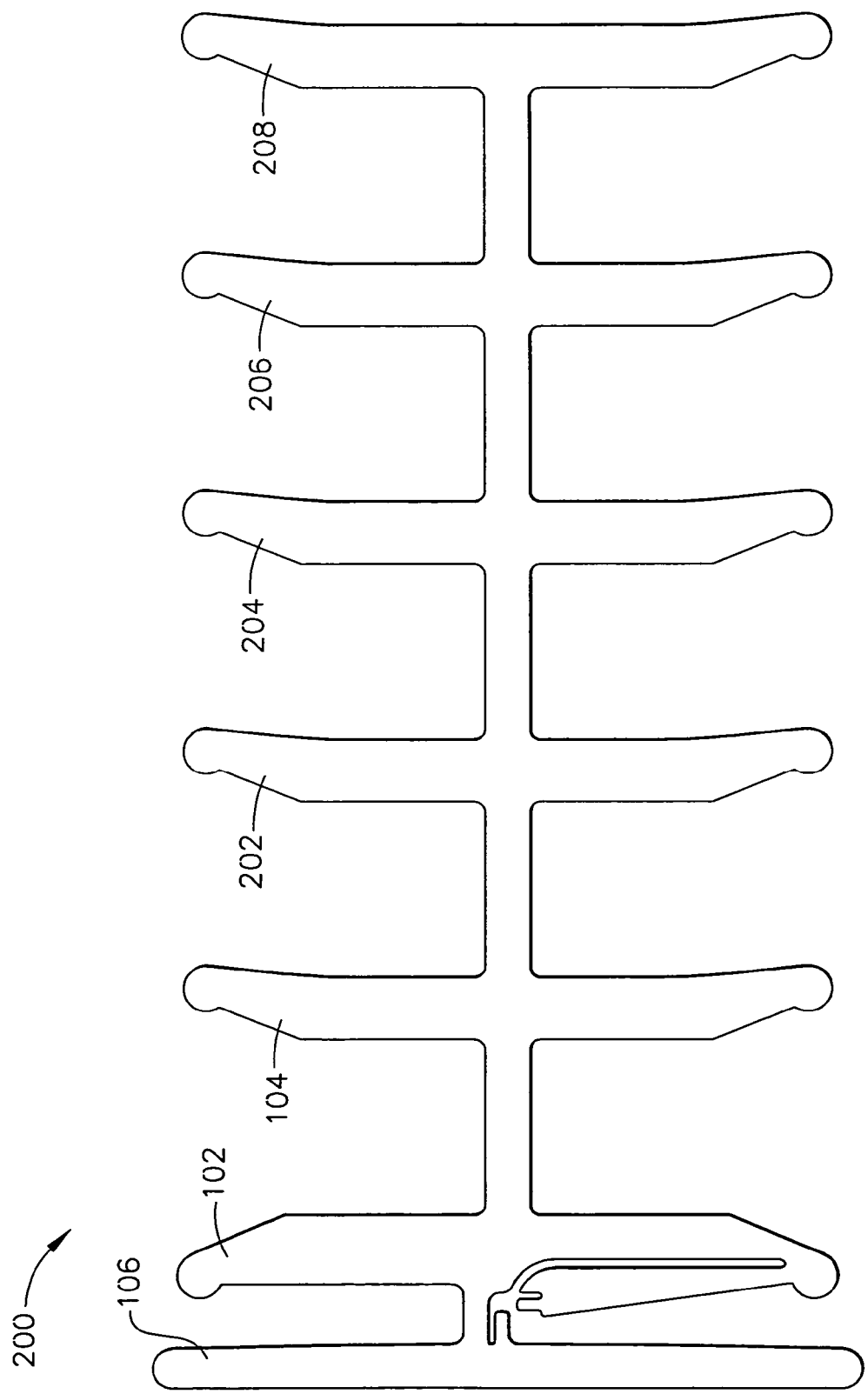
FIG. 2 is a planar view of a directional antenna array with parasitic elements in addition to the parasitic elements illustrated in FIG. 1.

Referring to FIG. 1, a planar view of a directional antenna array 100 is provided in accordance with an exemplary embodiment of the present invention. Generally, the directional antenna array 100 includes a driven element 102 and at least one (1) parasitic element or director element 104, and may include a second parasitic element or reflector element 106 in addition to the director element 104 in one exemplary embodiment. While only two parasitic elements (i.e., director element 104 and reflector element 106) are shown in FIG. 1 in addition to the driven element 102, any number of parasitic elements can be provided in accordance with an exemplary embodiment of the present invention. For example, a directional antenna array 200 is shown in FIG. 2 with four additional (4) parasitic elements (202, 204, 206, 208), which can be one or more additional director or reflector elements in addition to the director element 104 and reflector element 106 as shown in FIG. 1. Examples of other exemplary embodiments include but are not limited to the directional antenna array 100 having: a driven element and a reflector element; a driven element and a director element; a driven element and multiple reflectors; a driven element and multiple directors; and, a driven element with a combination of one or more director elements and reflector elements. In addition, these one or more additional director or reflector elements can be in-plane elements or out-of-plane elements, such as a trigonal reflector system having a first reflector positioned above and a second reflector positioned below a third reflector.

With continuing reference to FIG. 1, the driven element 102 may be the equivalent of a center-fed, half-wave dipole antenna in one exemplary embodiment. The director element 104 is positioned on one side of the driven element 102 and connected with a boom 108 and the reflector element 106 is positioned on the other side of the director element 102 and connected with another boom 110 such that the driven element 102 is interposed between the director element 104 and the reflector element 106. In addition, the director element 102 and the reflector element 106 may be positioned in at least a substantially parallel relationship with respect to the driven element 102 and may preferably be positioned in a parallel relationship with respect to the driven element 102.

In this exemplary embodiment, the directional antenna array 100 is a Yagi antenna. Accordingly, as known to those of ordinary skill in the art, the design of the directional antenna array 100 involves a selection of parameters of the driven element 102, director element 104 and/or reflector element 106 and other parameters of additional parasitic elements of the directional antenna array 100 if such elements are present. For example, the design of the directional antenna array can include selection of spacing between the elements (e.g., spacing ($S_{dir1}$) 112 between the driven element 102 and the director element 104 and spacing ($S_{ref}$) 114 between the driven element 102 and the reflector element 106), element lengths (e.g., driven element length ($L_{dri}$) 116, director element length ($L_{dir1}$) 118 and reflector element length ($L_{ref}$) 120), element widths, which as used herein shall include element diameters (e.g., driven element width ($W_{dri}$) 122, director element width ($W_{dir1}$) 124 and reflector element width ($W_{ref}$) 126). However, other parameters and parameters of additional antenna structure(s) can be used in the design of the directional antenna array 100 in accordance with techniques known to those of ordinary skill in the art (e.g., boom widths ($W_{b1}$) 128, ($W_{b2}$) 130).

The element shapes (i.e., round, square, triangular, pentagonal, hexagonal, etc.), the driven element length ($L_{dri}$) 116, the reflector element length ($L_{ref}$) 120, the director element length ($L_{dir}$) 118, the director element spacing ($S_{dir1}$) 112 and the reflector element spacing ($S_{ref}$) 114 are selected in accordance with the electrical resonant frequencies of the elements in accordance with techniques known to those of ordinary skill in the art. For example, the parameters of the directional antenna array 100 are selected such that the electrical frequency of resonance of the director element 104 is preferably greater than the free-space wavelength and the electrical frequency of resonance of the reflector element 106 is less than the free-space wavelength.

As known to those of ordinary skill in the art, any number of design variations exists for the directional antenna array (i.e., Yagi antenna) with the width relationship to the free-space wavelength in accordance with an exemplary embodiment of the present invention. For example, an exemplary boom width ($W_{b1}$) 128 and length and spacing of the driven element 102, director element 104 and reflector element 106 for a frequency range of approximately nine hundred and two megahertz (902 MHz) to about nine hundred and twenty-eight megahertz (928 MHz) is provided in Table 1.

TABLE 1

|  | Driven | Director | Reflector |
| --- | --- | --- | --- |
| Width | 0.56 inches | 0.49 inches | 0.33 inches |
| % Width | 4.35% | 3.8% | 2.57% |
| Spacing | Not Applicable | 1.86 inches | 0.89 inches |
| % Spacing | Not applicable | 14.4% | 6.9% |
| Length | 5.19 inches | 5.04 inches | 5.60 inches |
| % Length | 40.2% | 39% inches | 43.4% |

Where % Width, % Spacing and % Length are percentages of the free space wavelength and director spacing is the spacing ($S_{dir1}$) 112 between the driven element 102 and the director element 104 and the reflector spacing is the spacing ($S_{ref}$) 114 between the driven element 102 and the reflector element 106.

In accordance with an exemplary embodiment of the present invention, the illustrative example presented in Table 1, and other directional antenna arrays designed in accordance with the present invention, is preferably formed of a monolithic material having a thickness that is greater than about one skin depth at an operating frequency of the directional antenna array 100. The monolithic material can be any number of materials such as spring steel, beryllium copper, stainless steel or a combination thereof, and the monolithic material preferably can have a resistivity that is greater than about $0.1\times10^{-6}$ ohms-meter, preferably a resistivity that is greater than $0.2\times10^{-6}$ ohms-meter, more preferably greater than $0.4\times10^{-6}$ ohms-meter, even more preferably greater than $0.8\times10^{-6}$ ohms-meter, and most preferably greater than $1.0\times10^{-6}$ ohms-meter and $2.0\times10^{-6}$ ohms-meter. For example, the directional antenna array with the dimensions illustratively presented in Table 1 can be formed with a thickness of about one-sixteenth (1/16) inch FR-10 P.C. Board (PCB) and a two thousandths (0.002) inch copper tape formed on at least one side of the PCB.

Additional antenna(s) may be integrated with the directional antenna array 100. In one exemplary embodiment, a ferrite antenna 134, that is effective at lower frequencies such as 13.56 MHz or 135 kHz, may be mounted or otherwise coupled near a center of the director element 104. The ferrite antenna 134 may be insulated, such as with a sheet of Kaptan tape or other electrical insulating material, and coupled with a coaxial cable routed along the boom 108. In one exemplary embodiment, the ferrite antenna 134 is oriented such that a major axis of the ferrite antenna 134 is substantially parallel with the longest dimension of the director element 104 as best shown in FIG. 1.

A cross-over network (not shown) may be installed with the ferrite antenna 134 such that a single coaxial cable feeds the directional antenna array 100. For example, one output of the cross-over network can feed the Yagi antenna (e.g., at about 915 MHz), and another output of the cross-over network can feed the ferrite antenna (e.g., at about 13.56 MHz or about 135 KHz). Although coaxial cables may be used for coupling various antenna elements or components, a variety of different RF transmission line types may be used including, but not limited to, strip lines, micro strips, twin leads, flat plate lines, triaxials, co-planar wave guides, wave guides (e.g., rectangular, square, oval, round, etc.), fin lines, and trough lines.

Although one ferrite antenna element 134 is described in the foregoing exemplary embodiment, an array of ferrite antenna elements may also be configured. For example, multiple ferrite rods may be located near the driven element 102 and the reflector 106 as an "end-fire" array. In one exemplary embodiment, an "end-fire" array of 915 MHz ferrite antenna elements is suited to provide vertical polarization while minimizing any increase in the vertical dimension of the directional antenna array 100.

In another exemplary embodiment, a slot antenna may be integrated with the directional antenna array 100 as described in greater detail hereinbelow. For example, a longitudinal slot or an array of slots that are responsive to 2.45 GHz or 5.6 GHZ may be formed in the director element 104 or the boom 108, or in any of the other elements 102, 106, of the directional antenna array 100. In this exemplary embodiment, the slot antenna element or an array of slot antenna elements can be coupled with separate coaxial cables that are routed along the boom 108 of the Yagi antenna, or the elements of the Yagi antenna, with separate transmission lines to the elements, or coupled with a cross-over network. The multiple slotted elements operating at 2.45 GHz or 5.6 GHz may be used to increase antenna directivity or for electronic beam steering of the radiated signal on such frequencies.

Although the 2.45 GHz and 5.6 GHz radiating elements are described herein as slot radiators of the Yagi antenna, for example in various locations of a sheet metal, other types of radiating elements that are effective on such frequencies may also be used. For example, monopoles, dipoles, folded dipoles, half-folded dipoles, printed circuit patch antennas, printed inverted "F" antennas (PIFA), and the like may be applied to the Yagi sheet metal. Additionally, the Yagi antenna may be formed of other materials aside from sheet metal and of other configurations, such as metallic tubing (e.g., round, square, triangular, etc.), plastic, or other fibrous materials with a metallic coating (e.g., such that the RF "skin effect" creates a solid appearance). The Yagi elements may be configured as a loop, triangle, square, or the like. For example, the electronic performance of a "loop" Yagi element is substantially similar to a conventional dipole type Yagi element. Alternative element configurations may be selected for non-electronic performance considerations such as mechanical strength and immunity to water droplet (e.g., rain) de-tuning. In the latter case, water droplets tend to fall to a lower center of the loops such that added capacitance from the water droplets typically does not de-tune the element.

The physical size of the slot antenna may be minimized using dielectric loading or magnetic loading as may be appreciated by those of skill in the art. The slot antenna may also be constructed to be responsive to a desired frequency range based in part on the length of the longitudinal slot as well as the corresponding length of the director element. Alternatively, an LC (inductance-capacitance) matching network coupled to the slot antenna can supply the resonance, at the antenna or through a feed line, at a frequency of operation.

Figure 3:
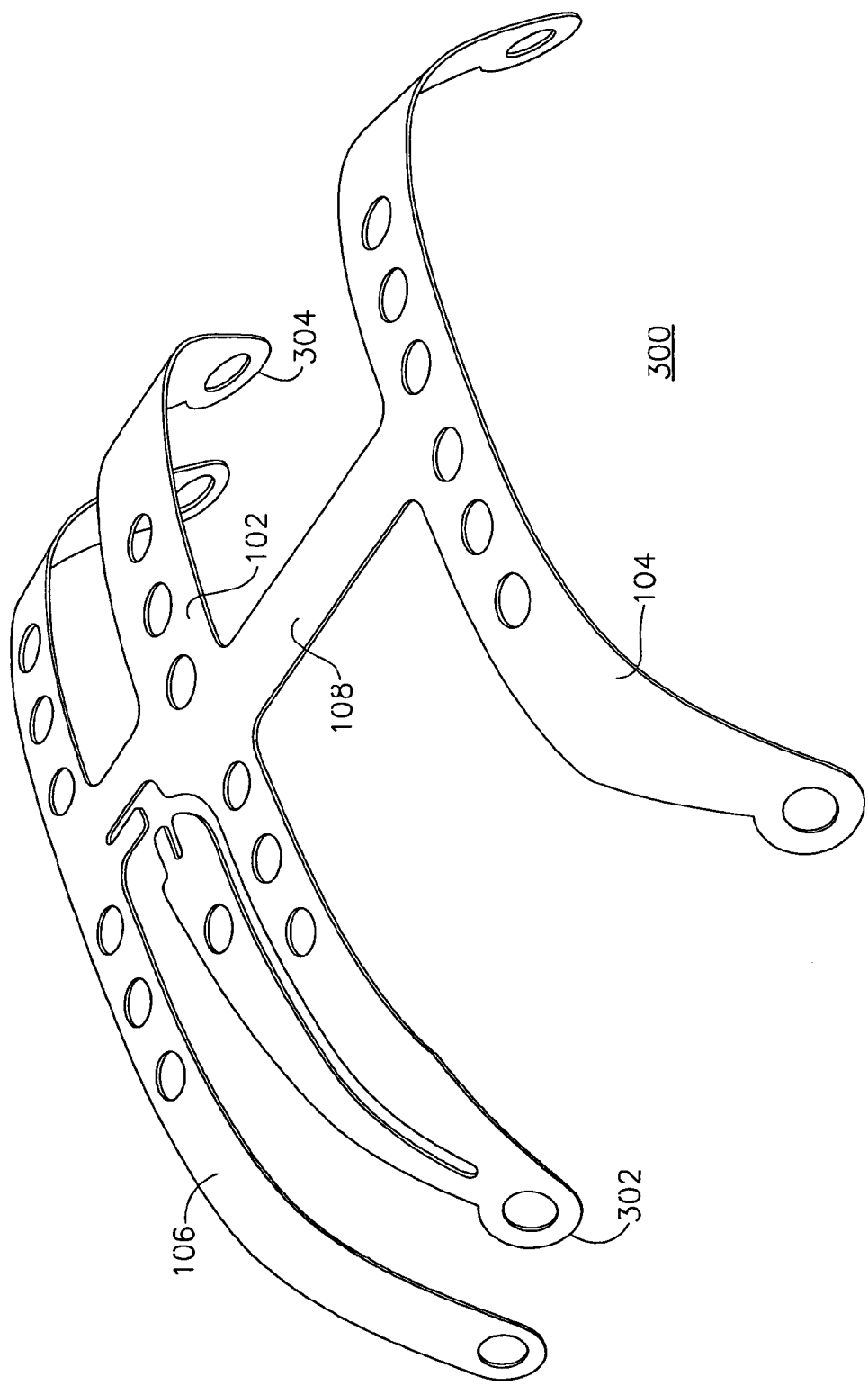
FIG. 3 is a first example of a non-planar folded configuration of the directional antenna array of FIG. 1 in accordance with an exemplary embodiment of the present invention.
Figure 4:
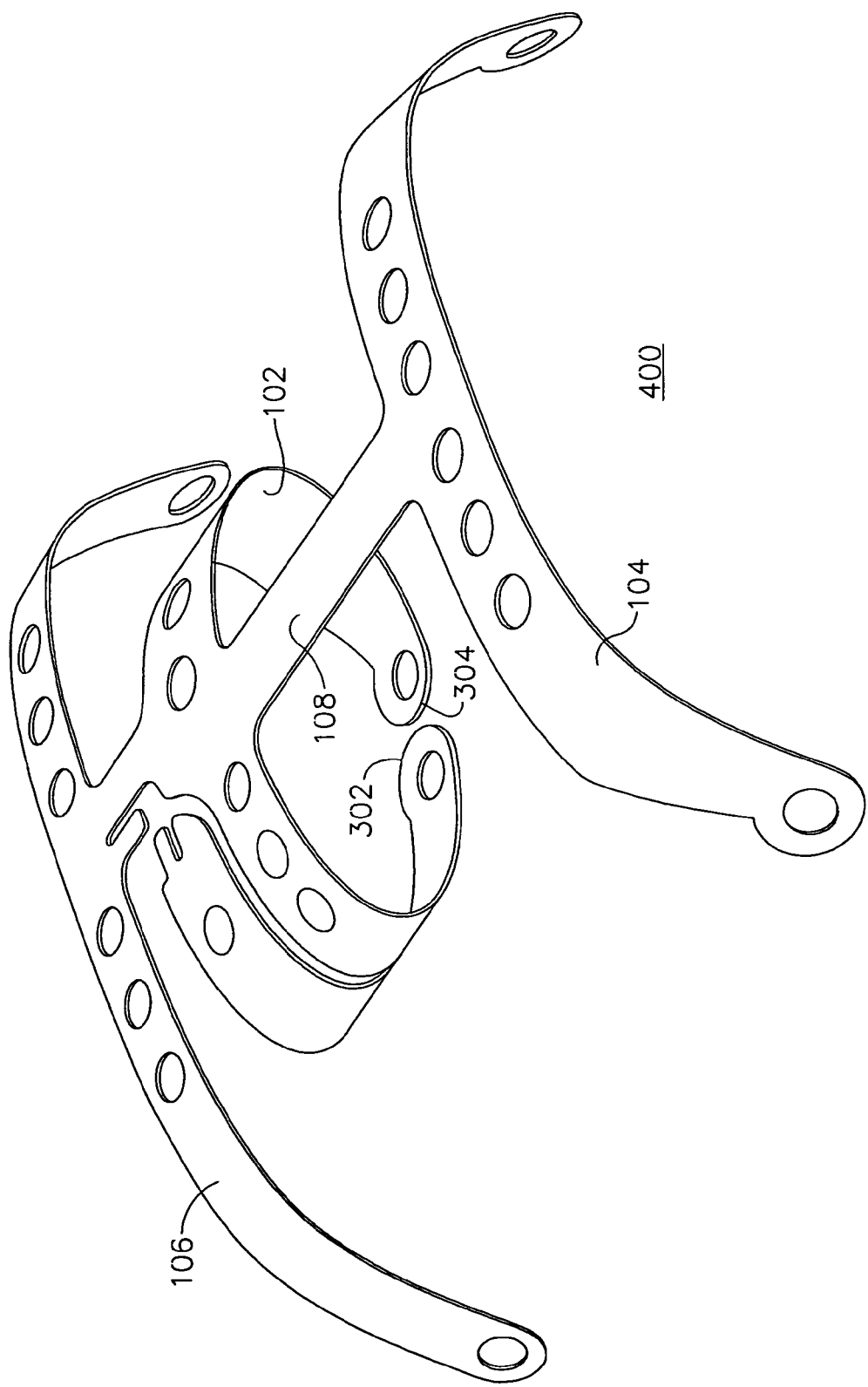
FIG. 4 is a second example of a non-planar folded configuration of the directional antenna array of FIG. 1 in accordance with an exemplary embodiment of the present invention.

With the directional antenna array 100 stamped, laser cut, water jet cut, etched, or otherwise formed from the monolithic material, the driven element 102 can be formed into a non-planar folded configuration. For example, the distal ends (302, 304) of the driven element 102 are folded to provide an angle of about ninety degrees (90°) with respect to the boom 108 to form the non-planar folded configuration 300 as shown in FIG. 3. Alternatively, and by way of example only, another non-planar configuration 400 can be formed by continuing to fold the distal ends (302, 304) of the driven element 102 until such ends are substantially adjacent and preferably directly under the boom 108 as shown in FIG. 4 or folded into any number of other shapes other than the elliptical shape of FIG. 4 (circle, square, triangle, etc). Furthermore, the director element 102 and/or reflector element 104 can be folded in a manner that is similar or the same as the driven element as shown in FIG. 3, in a different manner that is not similar to the driven element as shown in FIG. 4, or in any other manner to provide specific antenna characteristics or antenna aesthetics.

In another exemplary embodiment, the elements of the directional antenna array 100 (i.e., driven element 102, director element 104, and reflector element 106) may be constructed from printed coil structures. In this exemplary embodiment, an outer dimension, such as a perimeter dimension, and a length dimension of the printed coil structure may be configured to resonate at about 915 MHz, and the printed coil structure itself may be configured to resonate at about 13.56 MHz.

Although the driven element 102 is shown in a half folded dipole configuration, the driven element may take a variety of configurations, such as dipole, folded dipole, T-matched dipole, gamma-matched dipole, delta-matched dipole, and the like. Inter-element coupling coefficients or element spacings may be altered without changing the tuning of an element, as appreciated by those of skill in the art, such that the antenna may take on a variety of shapes. For example, wider areas of the boom generally results in a decrease in the coupling coefficients between nearby elements.

Referring to FIG. 1, the driven element 102 is coupled to a source of electromagnetic energy (not shown) and/or coupled to a sink of electromagnetic energy (not shown). The directional antenna array 100 of the present invention is inherently a balanced antenna, and the directional antenna array 100 is preferably coupled to the source and/or sink of electromagnetic energy to an unbalanced connector (e.g., a coaxial transmission line (not shown)) using a balun or baluning structure 500. The balun structure 500 is preferably configured for impedance-matched Radio Frequency (RF) energy to flow in either direction within the coaxial transmission line without the introduction of RF energy onto the outside of the coaxial transmission line. As can be appreciated, RF energy flowing on the outside of the coaxial transmission line is inherently wasteful and generally distorts the directive pattern of the directional antenna array, thus lowering the maximum bore sight gain.

Figure 5:
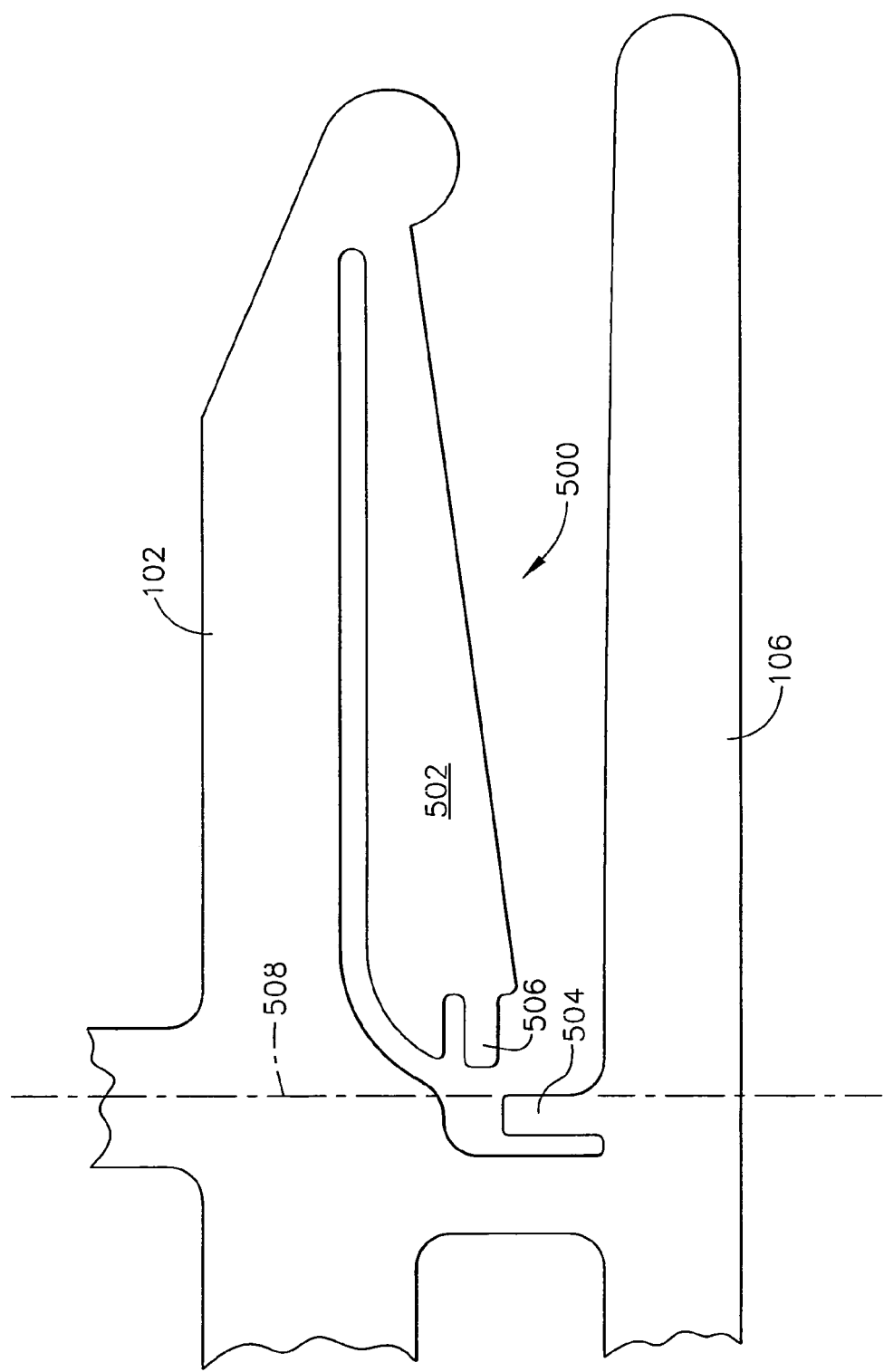
FIG. 5 is a balun structure for the directional antenna array of FIG. 1 in accordance with an exemplary embodiment of the present invention.

Referring to FIG. 5, an enlarged view of the driven element 102 is shown that presents an exemplary embodiment of the balun structure 500 in accordance with an exemplary embodiment of the present invention. The balun structure 500 may be formed from the monolithic material as previously described in this detailed description and includes a dipole structure 502 and two feed points (i.e., a first feed point 504 and a second feed point 506) that are configured to receive the unbalanced connector, which in this example is a coaxial transmission line. In addition, the balun structure may also include a difference between a first width ($W_{dri}$) 122 of the driven element 102 and a second width ($W_{dri2}$) 132 of the driven element 102 as shown in FIG. 1, which creates an electrical offset that can be adjusted to assist with nulling of the RF energy that otherwise would appear on the outer conductor of the coaxial transmission line. For example, the first width ($W_{dri}$) 122 is greater than a second width ($W_{dri2}$) 132 of the driven element 102. However, any number of unbalanced connector configurations can be used in accordance with the present invention.

Continuing with reference to FIG. 5, the first feed point 506 extends from the dipole structure 502 and receives the center conductor of the coaxial transmission line (i.e., the center conductor of the coaxial transmission line is connected to the first feed point 506). The second feed point 504 extends from the reflector element 106 and receives the outer conductor of the coaxial transmission line (i.e., the outer conductor of the coaxial transmission line is connected to the second feed point 504). However, the first feed point 506 and the second feed point 504 can exist at other locations of the directional antenna array.

The dipole structure 502 is biased off the center line 508 (i.e., off-center) of the directional antenna array and the dipole structure 502 may be a one-half folded dipole that is tapered, which feeds RF energy onto the driven element 102. The tapering of the one-half folded dipole serves a number of purposes, including, but not limited to, the dual purpose of providing a type of broad-band tapered impedance match to the driven element 102 as well as synthesizing a shunt capacitor in the vicinity of attachment point for the center of the coaxial transmission line. This provides numerous desirable features, including, but not limited to, a significantly lowered Voltage Standing Wave Ratio (VSWR) over a wider bandwidth of operation.

The off-center attachment of the balun structure 500 is configured to transmit the received signal in the following manner and the principle of antenna reciprocity will indicate equal validity of the principles during signal reception. During the time that the directional antenna array is transmitting an electromagnetic signal, the positive current that is launched by the center conductor of the coaxial transmission line would normally cause a current of substantially equal magnitude to be launched into the directional antenna array at the second feed point 504. However, without the corrective action of the balun structure 500, RF energy would generally be launched onto the coaxial transmission line outer conductor. As the driven element 102 operates with a circuit Q of approximately ten (10), which means that the circulating RF energy is about ten (10) times larger than that which is being supplied by the transmission line, the off-centered feed points (504, 506) cause a small amount of reversed-phase circulating RF energy to be launched onto the outer conductor of the coaxial transmission line.

When the positional or electrical offset of the feed points (504, 506) are properly established, a cancellation of the composite RF energy results that would have been launched onto the outer conductor of the coaxial transmission line. Fine tuning of the electrical offset provided by the two feed points (504, 506) can be accomplished without changing the resonant frequencies of the other elements of the directional antenna array with a number of techniques, such as offsetting the electrical position of the driven element 102 and/or the reflector element 106 as shown in FIG. 5 with an adjustment of the length on one side and positioning a piece of conductive tape on the other side. Alternatively, the relative widths of the left and right side of these elements can be adjusted accordingly. The electrical offsetting procedure is complete, and the baluning structure 500 has achieved a substantial balance when minimal and RF current can be sensed on the outer conductor.

The balun structure 500, element widths and/or the monolithic nature of the directional antenna array as previously described in this detailed description provide numerous desirable features. For example, the directional antenna array of the present invention has a low profile and can conform to any number of shapes. In addition, the directional antenna array of the present invention can maintain structural shape and integrity, including maintenance of structural shape and integrity after application of an external force.

Figure 6:
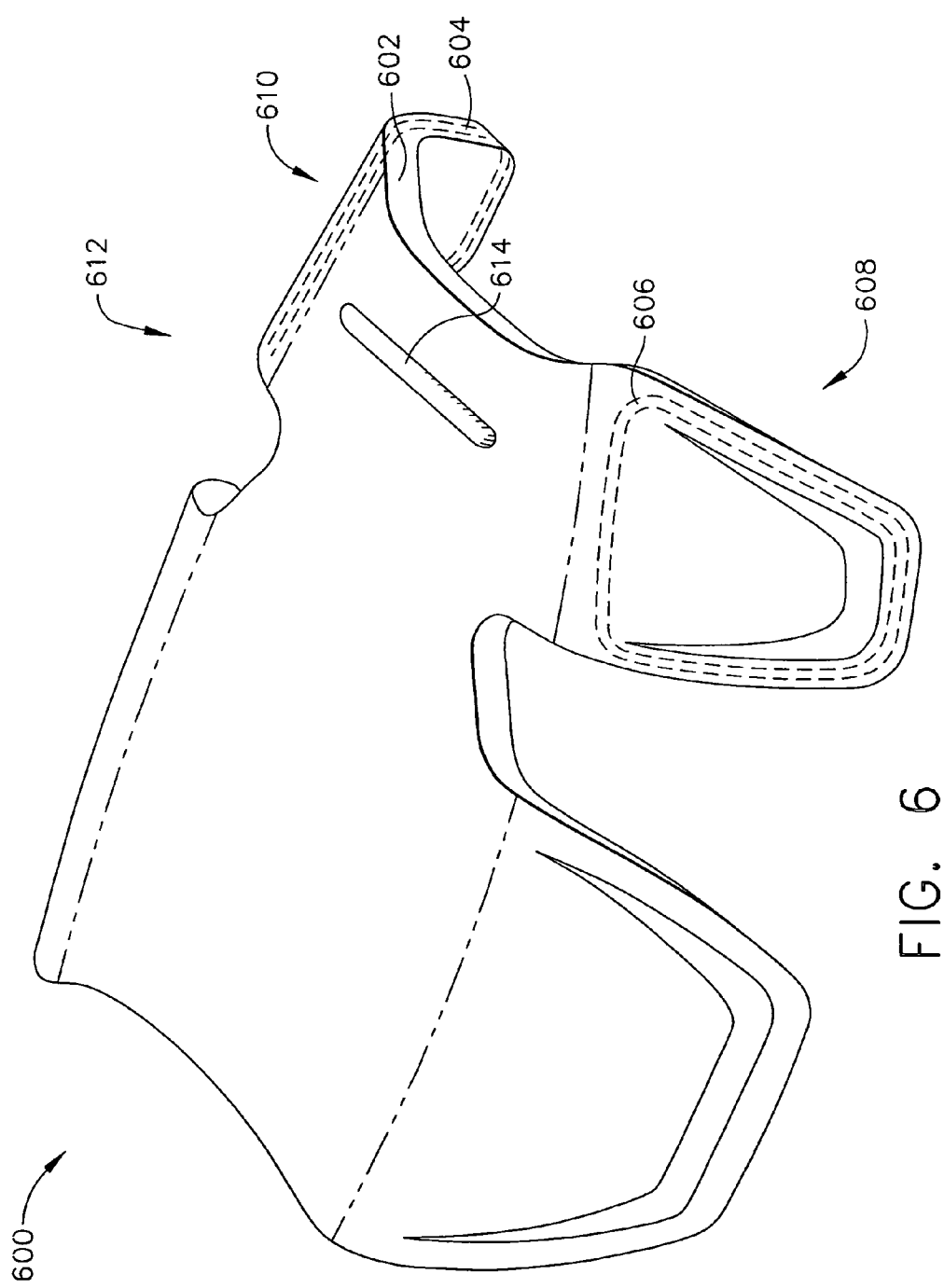
FIG. 6 is the directional antenna array of FIG. 3 with an elastomer cover in accordance with a first exemplary embodiment of the present invention.
Figure 7:
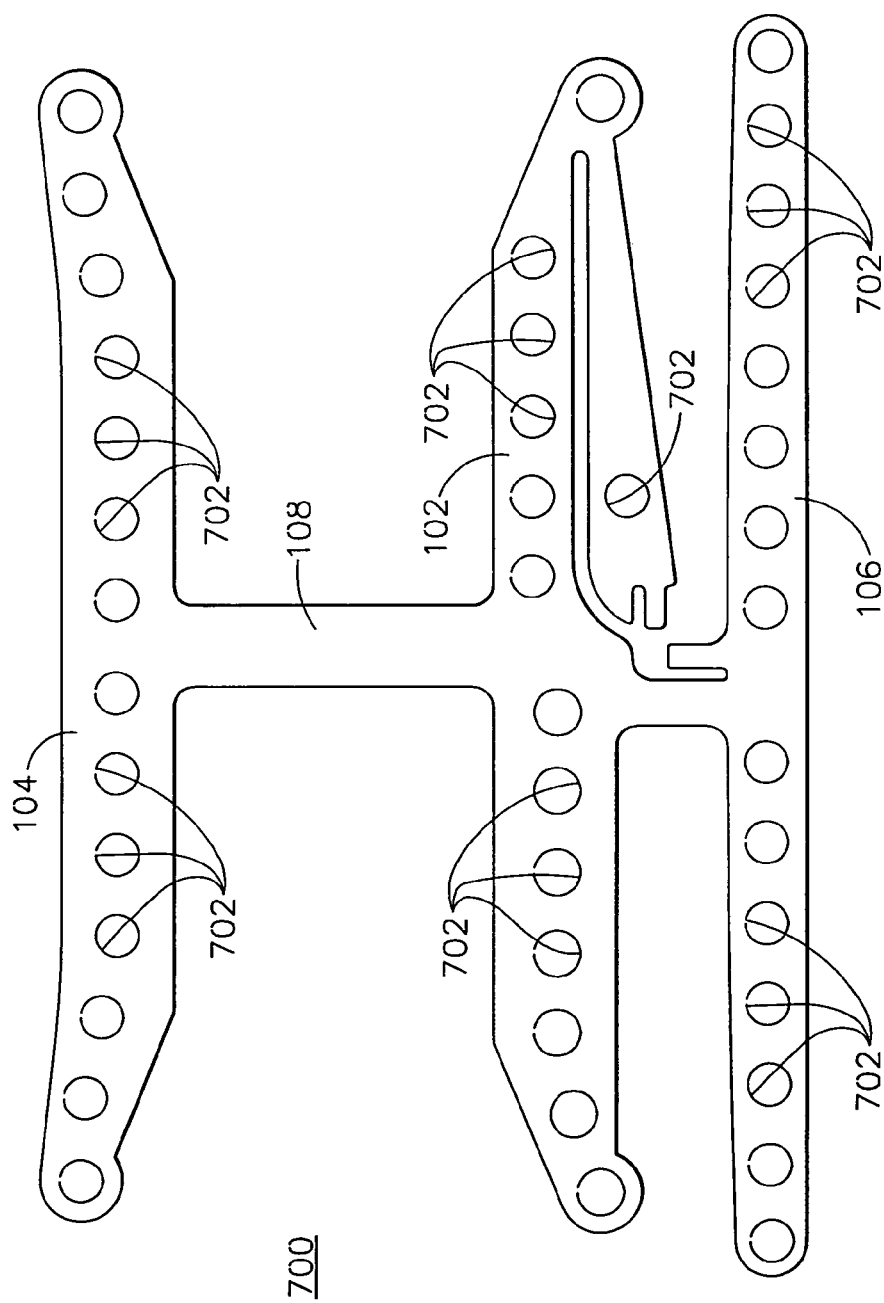
FIG. 7 is the directional antenna array of FIG. 1 with apertures.

FIG. 6 is the directional antenna array of FIG. 3 with an elastomer cover in accordance with a first exemplary embodiment of the present invention. In order improve the ability of the directional antenna to maintain structural shape and integrity, including maintenance of structural shape and integrity after application of an external force, a portion of the directional antenna array 600, and more preferably a substantial portion or substantially all or all of the directional antenna array 600, is covered with an elastomer 602 as best shown in FIG. 6. The directional antenna array 600 can be configured to provide at least a portion of the structural support of the elastomer 602, and apertures 702 may be formed in one, some, or all of the elements of the directional antenna array 700 as shown in FIG. 7. This increases the ability of the directional antenna array 700 to survive surface impacts, which is beneficial in numerous environments and applications. For example, this low profile and rugged directional antenna array is beneficial in numerous electronics applications, including portable or hand-held devices such as cellular telephones, satellite telephones and contactless interrogators of Automatic Identification (Auto ID) systems, such as RFID interrogators of RFID systems.

In a first exemplary embodiment, the directional antenna array 600 includes a near-field antenna 612 that may be used for reading inductively coupled RFID tags (e.g., 125 kHz and 13.56 MHz). The near-field antenna includes conductive current loops (604, 606) incorporated with the elastomer 602 and positioned about a parasitic element, such as the director element 104 shown in FIG. 1. The conductive current loops (604, 606) may also be located in other substrates formed about the parasitic element 104. In this exemplary embodiment, the conductive current loops (604, 606) are located in a pair of lobes (608, 610) formed by the elastomer 602 and directional antenna array 600 such that each of the conductive current loops (604, 606) resides in a corresponding lobe (608, 610). The lobes (608, 610) are each located at opposite ends of a longest dimension of the parasitic element, such as a width as illustrated in FIG. 6. In this exemplary embodiment, the conductive current loops (604, 606) are positioned to maximize near-field electromagnetic fields while canceling far-field electromagnetic fields. The conductive current loops (604, 606) are constructed to minimize far-field radiated intensity and allow for a stronger near-field pattern. For example, far-field cancellation may be achieved by generating currents of opposite polarity in the conductive current loops (604, 606) while maintaining a strong near field.

As previously mentioned hereinabove, a ferrite antenna 614 that is effective at lower frequencies such as 13.56 MHz or 135 kHz, such as the ferrite antenna 134 shown in FIG. 1, may be integrated with the directional antenna array 600. For example, the ferrite antenna 614 may be mounted to near the center of the director element, in this exemplary embodiment, between the conductive current loops (604, 606).

Figure 8:
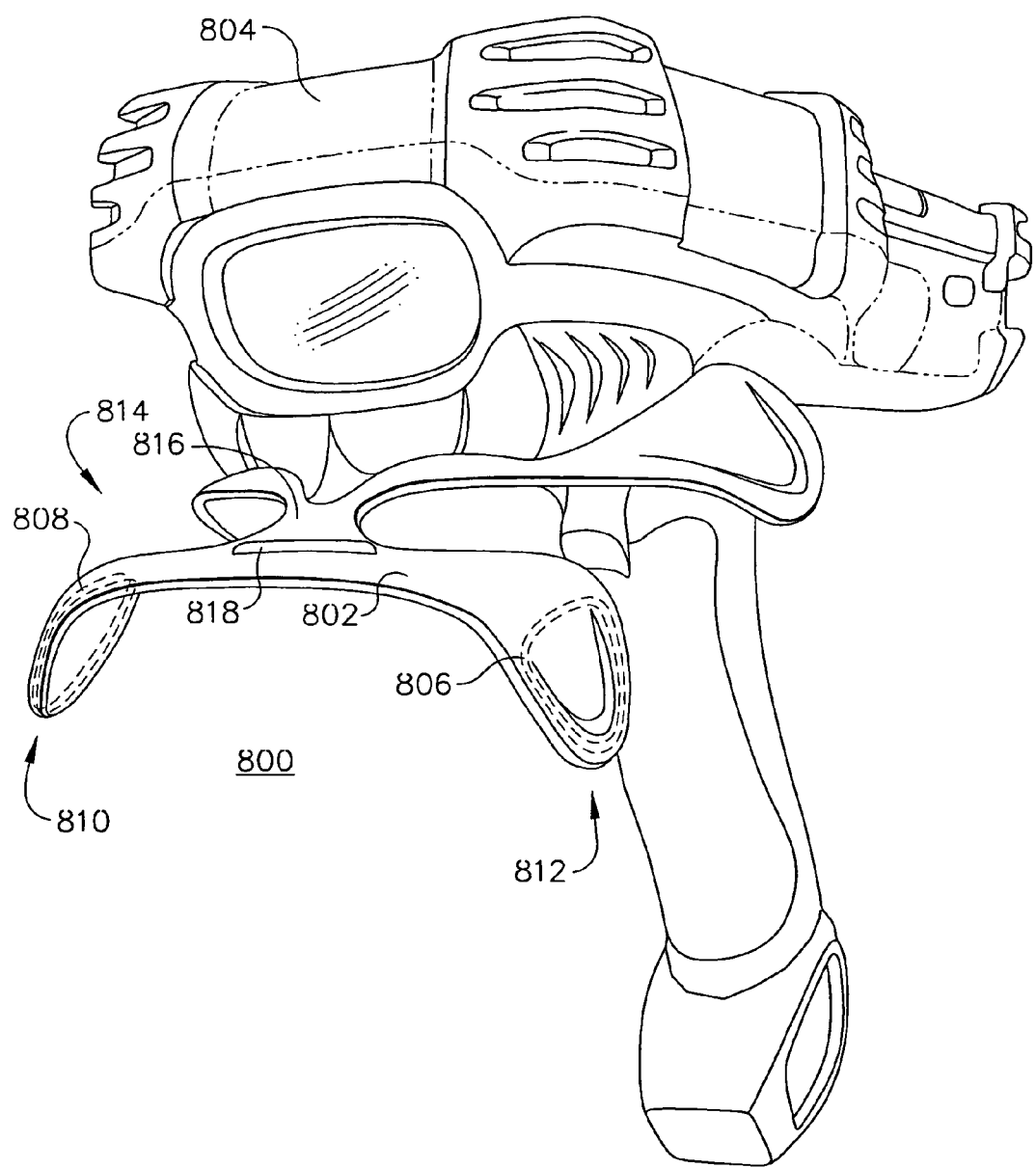
FIG. 8 is a portable/handheld device having the directional antenna array of FIG. 6 in accordance with a first exemplary embodiment of the present invention.

Referring to FIG. 8, a portable/handheld device 800 is illustrated in accordance with a first exemplary embodiment of the present invention. The portable/handheld device 800, which in this illustrative example is an RFID interrogator of an RFID system, includes a processing module 804 (e.g., an RFID processing module having any number of configurations known to those of ordinary skill in the art) and the directional antenna array 802 in accordance with one or more of the embodiments of the directional antenna array 802 as previously described in this detailed description. However, as can also be appreciated by those of ordinary skill in the art, a portable/handheld device of other electronic systems can be formed in accordance with the present invention or non-portable non-handheld devices can be formed in accordance with the present invention.

In the first exemplary embodiment, the directional antenna array 802 has a far-field antenna 816, such as the Yagi-type previously discussed hereinabove operating at about 915 MHz. The directional antenna array 802 is configured to include a parasitic element, such as the director element 104 shown in FIG. 1, having lobes (810, 812) similar to the lobes (608, 610) shown in FIG. 6. A near-field antenna 814 is coupled to the far-field antenna 816, such as via the elastomer as previously discussed hereinabove. In one embodiment, the near-field antenna 814 includes conductive current loops (806, 808), such as the conductive current loops (604, 606) shown in FIG. 6, that are located about the perimeters of the lobes (810, 812).

The conductive current loops (806, 808) resonate at about 125 kHz and about 13.56 MHz, or other desired frequency bands, for reading inductively coupled tags at the corresponding frequency. Additional antenna elements (not shown) may be added to the directional antenna array 802 such as far-field antenna elements. For example, a 2.45 GHz and a 5.6 GHz folded dipole may be co-located on the same substrate as the 915 MHz far-field antenna. Although not specifically detailed herein, those of skill in the art will appreciate that other frequency bands may be used for identification based on a designated frequency for a particular RFID tag. Although the various antenna elements of the directional antenna array are described in the context of folded dipole elements, other types of radiating elements may be used including, but not limited to, slot antenna type elements, non-folded dipole elements, printed circuit patch antenna elements, monopole antenna elements, and the like.

In another exemplary embodiment, a ferrite antenna 818, such as the ferrite antenna 134 shown in FIG. 1, is mounted to the near field antenna 814 in a central region between the conductive current loops (806, 808). The ferrite antenna 818 may be fed by a coaxial cable (not shown) that is routed along the boom 108 (FIG. 1) of the directional antenna array 802. As previously mentioned hereinabove, a cross-over network (not shown) may be installed with the ferrite antenna 818 such that a single coaxial cable can feed the directional antenna array 802 such that one output of the cross-over network feeds the Yagi antenna (e.g., at about 915 MHz) and another output of the cross-over network feeds the ferrite antenna (e.g., at about 13.56 MHz or about 135 KHz).

The conductive current loops (604, 606) are coupled to a current or voltage source (not shown), or the previously discussed electromagnetic field source, that may be housed in the portable/handheld device 800. For a desired emission level at an operating frequency, such as 125 kHz, the conductive current loops may be designed based upon a maximum B-field. From the Biot-Savart Law of magnetic induction, conductive current loops or coils with the following ampere-turns produces the desired maximum field strength at a center of the loops:

$$NI = 2a_r \frac{B}{\mu_0} \qquad \text{Eq. 1}$$

where N is the number of turns of loops, I is the current, $a_r$ is the radius of the loops, B is the magnetic field strength, and $\mu_0$ is the magnetic permeability of space.

The voltage source may be a fixed voltage drive or a constant current drive. For a fixed voltage drive embodiment, a series resonant RLC circuit may be used for a transmitter network having resistance $R_r$, inductance $L_r$, and capacitance $C_r$. The fixed voltage drive is generally efficient at delivering maximum current at a resonant frequency and suppressed spurious harmonics outside of the operational frequency band. Using the fixed voltage drive embodiment, the transmitting network is adaptively adjustable to the resonant frequency of a receiving network, such as an RFID tag.

For a constant current drive embodiment, a series RLC circuit is also used for a transmitter network, as previously discussed hereinabove regarding the fixed voltage drive embodiment. The constant current drive generally maintains constant resultant field strength in spite of induced back-electromagnetic field (EMF) effects that tend to counteract field generation. With the constant current drive embodiment, maximum power transfer will generally be maintained regardless of the coupling between the transmitting network and the receiving network.

The processor module 804 determines a specific frequency band associated with an individual RFID tag. The processor module 804 may control EM emission from each of the near-field antenna 814, far-field antenna, and additional antenna elements if included in a particular configuration to determine the frequency band for an RFID tag. For example, the processor module 804 may operate one or more of the near-field antenna elements and far-field antenna elements to poll each of the frequency bands (e.g., 125 kHz, 13.56 MHz, 915 MHz, 2.45 GHz, and 5.6 GHz) for a response from the RFID tag or detection thereof. Once a response is detected from the RFID tag, the processor module 804 tunes the portable/handheld device 800 to the appropriate frequency band.

In one exemplary embodiment, tuning of the transmitting network coupled to the conductive current loops (604, 606) to match the resonant frequency of the conductive current loops (604, 606) with an individual RFID tag may be accomplished using a veractor or similar voltage or current controlled capacitor element placed in parallel with the series resonant capacitor $C_r$. A combination of a tunable capacitor for fine tuning and a network of high-quality capacitors for coarse tuning may also be utilized. In one example of tuning, the processor module 804 sets a new resonant frequency by changing both a driving frequency and a total capacitance of the series RLC circuit including any capacitance coupled thereto such as the veractor. Based on the capacitor voltage, the processor module 804 can determine a proper veractor setting (i.e., capacitance) for series resonance of the changing frequency and when the transmitter and receiver circuits are maximally coupled. The processor module 804 may also regulate the current into the conductive current loops (604, 606) for maintaining desirable field strengths.

In another exemplary embodiment, the processor module 804 may be coupled to a user input device (not shown), such as a selector switch, that permits a user to select one or more frequency bands for operation. For example, the user may select the 125 kHz and 915 MHz frequency bands for operation of the portable/handheld device 800. In this example, the processor module 804 controls EM emission from one or more of the near-field antenna 814, far-field antenna, and additional antenna elements, if included, to poll each of the 125 kHz band and the 915 MHz band for a response from an RFID tag. Any variety of combinations of the aforementioned frequency bands as well as other frequency bands may be selected by the user.

Figure 9:
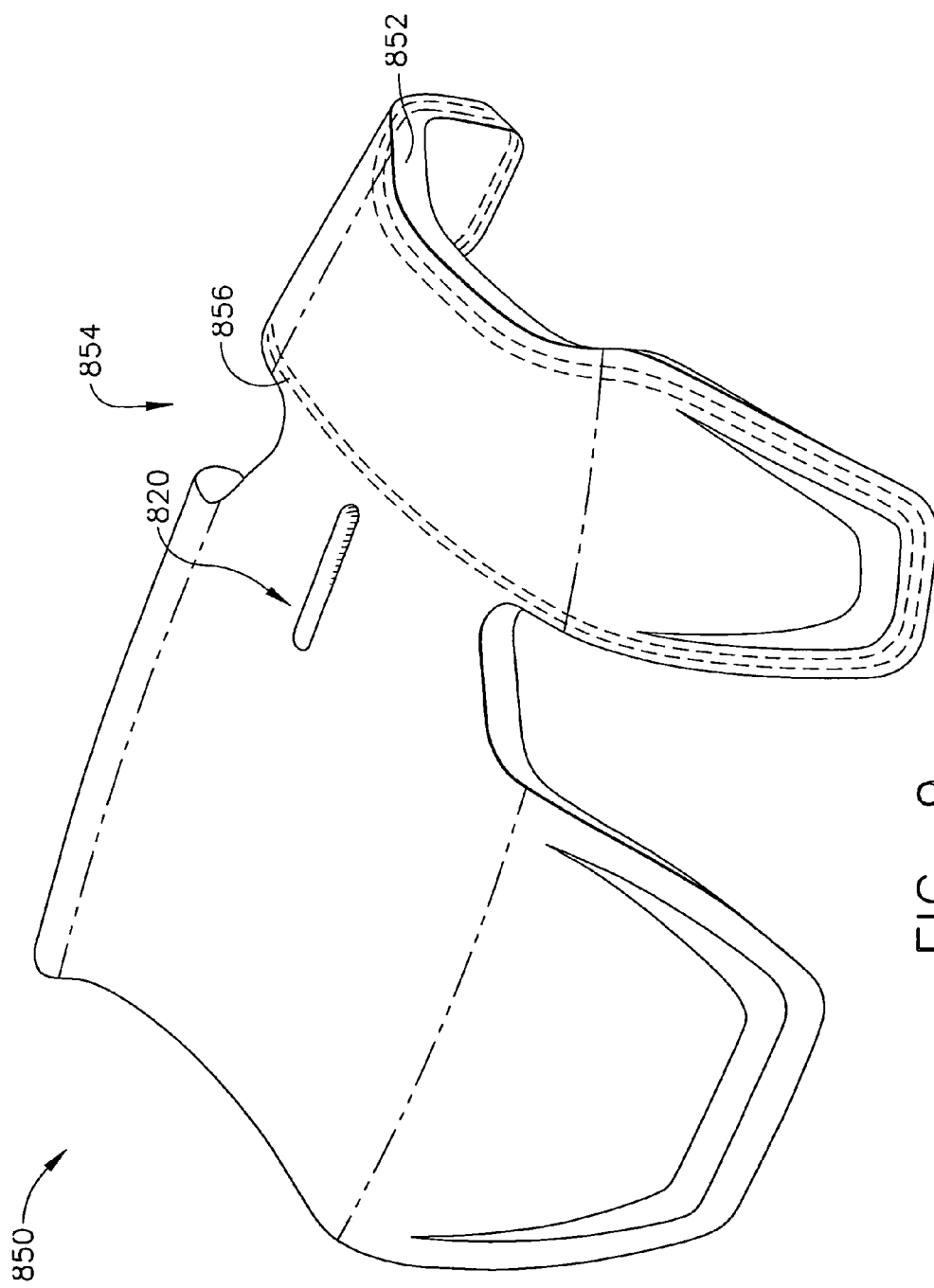
FIG. 9 is a directional antenna array with an elastomer cover in accordance with a second exemplary embodiment of the present invention.

FIG. 9 is a directional antenna array 850 with an elastomer cover 852 in accordance with a second exemplary embodiment of the present invention. A portion of the directional antenna array 850, and more preferably a substantial portion or substantially all or all of the directional antenna array 850, is covered with the elastomer 852. The directional antenna array 850 can be configured to provide at least a portion of the structural support of the elastomer 852. In this second exemplary embodiment, the directional antenna array 850 includes a near-field antenna 854 that may be used for reading inductively coupled RFID tags (e.g., 125 kHz and 13.56 MHz). The near-field antenna 854 includes a conductive current loop 856 incorporated with the elastomer 852 and positioned about a parasitic element, such as the director element 104 shown in FIG. 1. The conductive current loop 856 may also be located in other substrates formed about the parasitic element 104. In this exemplary embodiment, the conductive current loop 856 is located about a perimeter of the director element and encircles a longest dimension of the director element, such as a width as illustrated in FIG. 9. In this exemplary embodiment, the conductive current loop 856 is positioned to generate a stronger near-field electromagnetic fields.

In this exemplary embodiment, a slotted antenna 820 that is responsive to 2.45 GHz or 5.6 GHz is formed in the directional antenna array 850. A longitudinal slot 820, or an array of slots, may be formed in a region of the boom and fed by one or more separate coaxial cables (not shown) routed along the boom or the other antenna elements. This is then coupled with a cross-over network (not shown) or fed separately with one or more coaxial cables, as previously discussed hereinabove.

Figure 10:
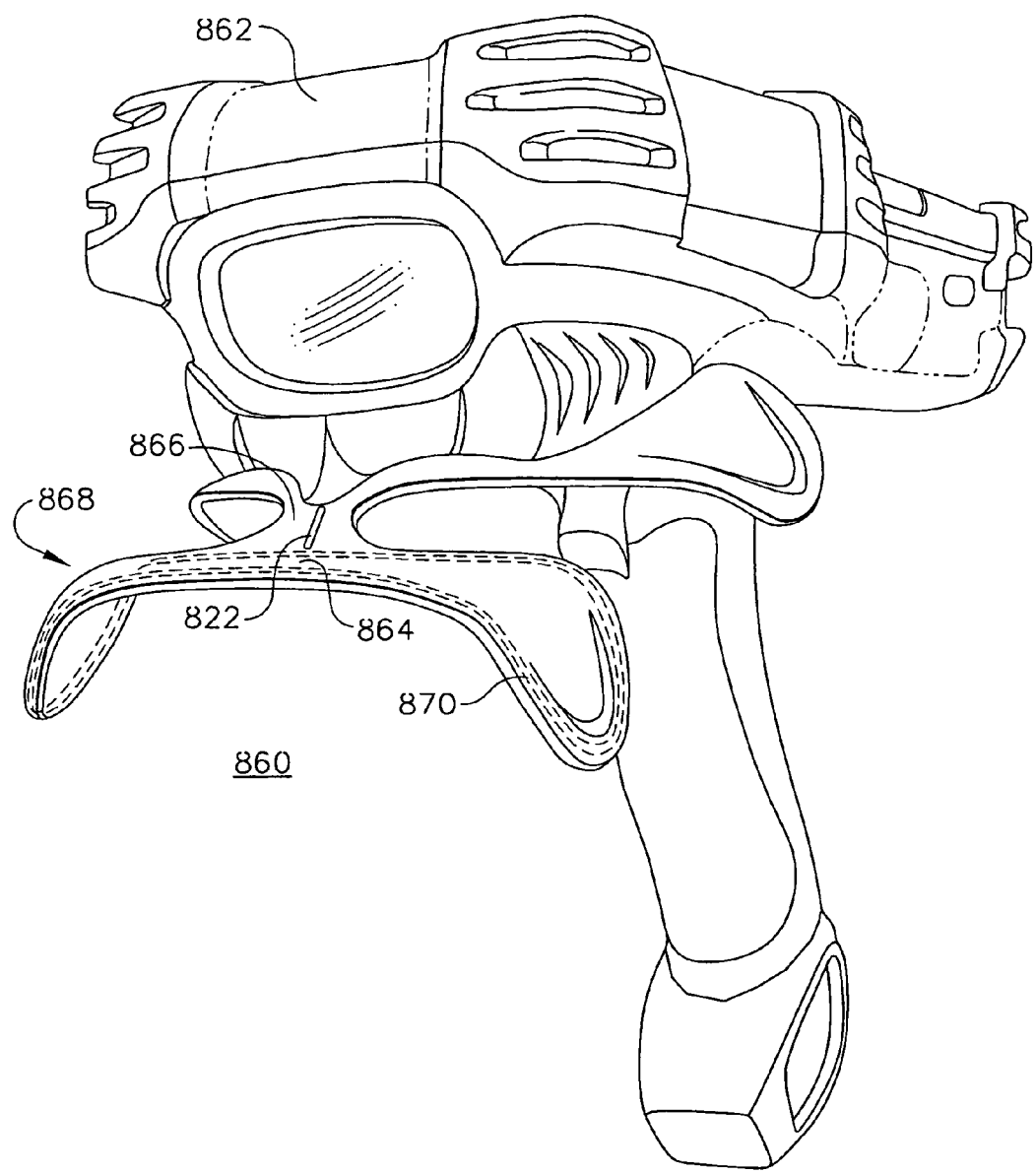
FIG. 10 is a portable/handheld device having the directional antenna array of FIG. 9 in accordance with a second exemplary embodiment of the present invention.

FIG. 10 is a portable/handheld device having the directional antenna array of FIG. 9 in accordance with a second exemplary embodiment of the present invention. In this second exemplary embodiment, the portable/handheld device 860 is similar to the portable/handheld device 800 shown in FIG. 8 and is also an RFID interrogator of an RFID system having the processing module 862 and the directional antenna array 864.

The directional antenna array 864 has a far-field antenna 866, such as the Yagi-type previously discussed hereinabove operating at about 915 MHz. The directional antenna array 864 is configured to include a parasitic element, such as the director element 104 shown in FIG. 1. A near-field antenna 868 is coupled to the far-field antenna 866, such as via the elastomer as previously discussed hereinabove. In one embodiment, the near-field antenna 868 includes a conductive current loop 870, such as the conductive current loop 856 shown in FIG. 6, that is located about the perimeter of the director element 104. The conductive current loop 870 may also resonate at about 125 kHz and about 13.56 MHz, or other desired frequency bands, for reading inductively coupled tags at the corresponding frequency.

Additional antenna elements may be added to the directional antenna array 864, such as far-field antenna elements, as previously mentioned hereinabove. For example, a slotted antenna 822, such as the slotted antenna 820 shown in FIG. 9, is formed in the directional antenna array 864. The slotted antenna 820 may be configured to be responsive to 2.45 GHz or 5.6 GHz based on the length of the slotted antenna 820.

In another exemplary embodiment, multiple radiating elements, such as an array, dedicated to respond to 2.45 GHz and 5.6 GHz may be installed with the directional antenna array. Such an array of radiating elements may be configured to be parasitically-driven, partially all-driven, mostly all-driven, or all-driven on each of the 2.45 GHz and 5.6 GHz frequencies, or on multiple sets of such frequencies. This exemplary embodiment may provide increases in antenna gain by way of increased directivity, effective radiated power (ERP), and corresponding RFID tag read range.

Additionally, such multiple radiating elements may be configured to be electronically steerable. In this exemplary embodiment, the processing module 862 is configured to steer a radiated beam from the multiple radiating elements such that ERP may be maximized in desirable directions and minimized in non-desirable directions. For example, the radiated beam may be steered away from adjacent interrogators by the processing module 862 so as to minimize interference between the interrogators. This feature is particularly useful in large distribution centers where many docking portals have simultaneously operating interrogators. Examples of other arrays of radiating elements include, but are not limited to, an array of different-sized slots that may be used for multiple frequencies of operation and an array of similarly-sized slots that may be collectively used for increased directivity.

Figure 11:
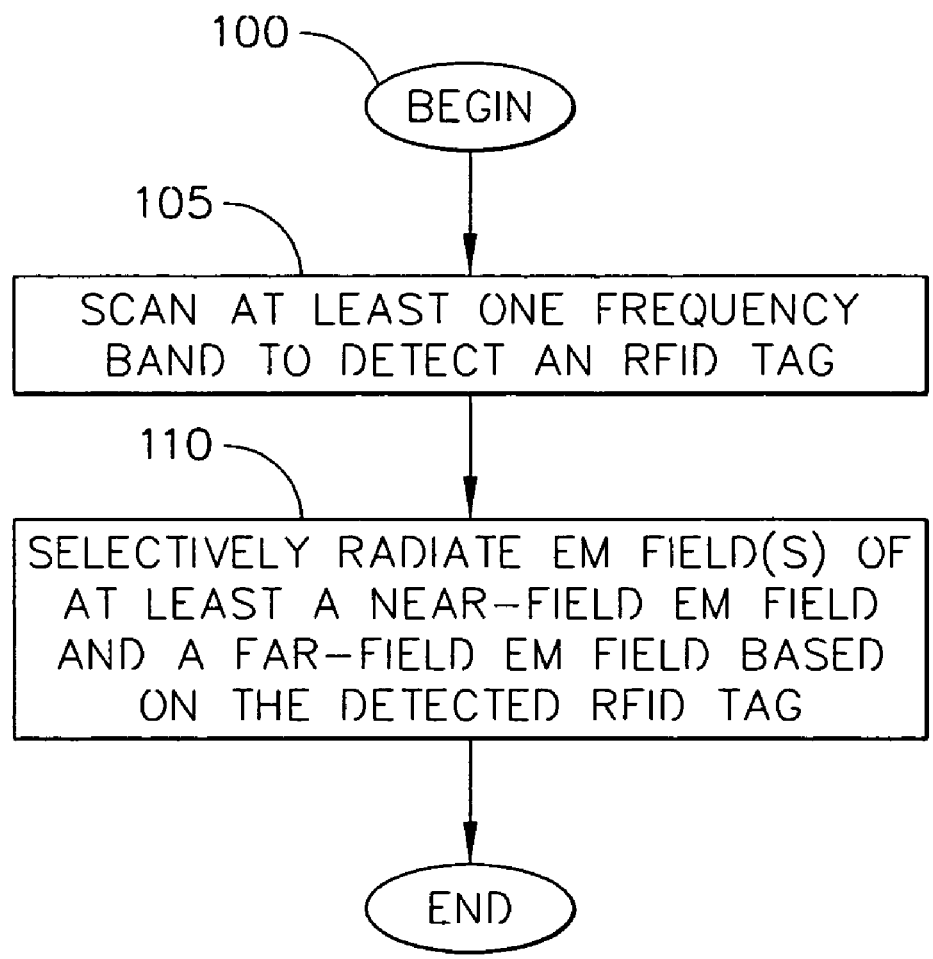
FIG. 11 is a flow diagram of a method of reading inductively coupled radio frequency identification tags in accordance with an exemplary embodiment of the present invention.

FIG. 11 is a flow diagram of a method of reading inductively coupled RFID tags in accordance with an exemplary embodiment of the present invention. The method begins at step 100. The processing module 804 (FIG. 8) scans at least one frequency band to detect an RFID tag at step 105. As previously discussed hereinabove, the processing module 804 (FIG. 8) determines a proper veractor setting (i.e., capacitance) for series resonance of the changing frequency and when the transmitter and receiver circuits (e.g., RFID tags) are maximally coupled. In one exemplary embodiment, the processor module 804 (FIG. 8) scans for a frequency band selected from the previously mentioned near-field and far-field EM fields including, but not limited to, 915 MHz, 125 kHz, 13.56 MHz, 2.45 GHz, and 5.6 GHz.

The processor module 804 (FIG. 8) operates one or more of the near-field and far-field antenna elements to selectively radiate an EM field of at least one of the near-field EM field and the far-field EM field based on the detected RFID tag at step 110. For example, the processor module 804 (FIG. 8) may operate a 915 MHz far-field antenna element, such as the far-field antenna 816 shown in FIG. 8, and a 125 kHz near-field antenna element, such as the near-field antenna 814 shown in FIG. 8. In one exemplary embodiment, the near-field element, such as the near-field antenna 814 having the conductive current loops 806, 808 shown in FIG. 8, may be operated to maximize near-field EM radiation that achieves far-field cancellation or minimizes far-field EM radiation from the far-field element, such as the far-field antenna 816 shown in FIG. 8.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A portable/handheld device, comprising:
   a processing module configured to selectively operate a reading mode selected from a far-field mode and a near-field mode; and
   a directional antenna array coupled to said processing module, said directional antenna array comprising:
     a first antenna element configured to radiate electromagnetic (EM) radiation in a far-field; and
     a second antenna element coupled to said first antenna element, said second antenna element configured to radiate EM radiation in a near-field, said second antenna element comprising an antenna transducer configured to selectively cancel far-field EM radiation from said first antenna element.

2. A portable/handheld device according to claim 1, wherein said portable/handheld device is a radio frequency identification (RFID) interrogator.

3. A portable/handheld device according to claim 1, wherein said first antenna element and said second antenna element are both configured to radiate EM radiation substantially away from said processing module.

4. A portable/handheld device according to claim 1, wherein said first antenna element comprises a driven element and a parasitic element separated from said driven element, said parasitic element comprises at least one element selected from a reflector element and a director element.

5. A portable/handheld device according to claim 4, wherein a first element of said at least one element of said parasitic element is configured to resonate at about 915 MHz; and
   wherein said second antenna element is configured to resonate at a frequency selected from 125 kHz and 13.56 MHz.

6. A portable/handheld device according to claim 5, wherein a second element of said at least one element of said parasitic element is configured to resonate at a frequency selected from about 2.45 GHz and about 5.6 GHz.

7. A portable/handheld device according to claim 4, wherein said antenna transducer of said second antenna element comprises at least one conductive current loop.

8. A portable/handheld device according to claim 7, wherein said at least one conductive current loop encircles a perimeter of one of said at least one element of said parasitic element.

9. A portable/handheld device according to claim 7, wherein said antenna transducer of said second antenna element comprises a first conductive current loop and a second conductive current loop spaced apart from said first conductive current loop, each of said first conductive current loop and said second conductive current loop encircles an axis of a largest dimension of said parasitic element, said first conductive current loop and said second conductive current loop together configured to create far-field cancellation.

10. A portable/handheld device according to claim 5, wherein said second element of said at least one element of said parasitic element comprises at least one of a 2.45 GHz radiating element and a 5.6 GHz radiating element.

11. A portable/handheld device according to claim 5, wherein said at least one element of said parasitic element is selected from a slotted antenna, a dipole element, a printed circuit patch antenna element, and a monopole antenna element.

12. A portable/handheld device according to claim 1, wherein said first antenna element comprises an array of radiating elements, said array of radiating elements configured as one of parasitically-driven, partially all-driven, and all-driven, said array of radiating elements further configured to operate in at least one frequency selected from about 2.45 GHz and about 5.6 GHz.

13. A portable/handheld device according to claim 12, wherein said array of radiating elements is configured to radiate a beam, said processor module is further configured to electronically steer said radiated beam.

14. A portable/handheld device according to claim 1, wherein one of said first antenna element and said second antenna element is an array of slotted antennas, each of said array of slotted antennas having a different size based on a different frequency of operation.

15. A portable/handheld device according to claim 1, wherein one of said first antenna element and said second antenna element is an array of slotted antennas, each of said array of slotted antennas having a similar size.

16. A portable/handheld device according to claim 2, wherein said processor module is further configured to scan frequency bands for RFID tags.

17. A portable/handheld device according to claim 2, wherein said processor module is further configured to:
   designate user-selected frequency bands; and
   scan said user-selected frequency bands for RFID tags.

18. A multi-frequency radio frequency identification (RFID) device, said device comprising:
   a processor configured to scan frequency bands for RFID tags and select a reading mode frequency band based on said scanned frequency bands;
   a switch coupled to said processor, said switch configured to select at least one reading mode frequency band;
   a first antenna element coupled to said processor, said first antenna element configured to radiate electromagnetic (EM) radiation in a far-field; and
   a second antenna element coupled to said first antenna element, said second antenna element configured to radiate EM radiation in a near-field, said second antenna element comprising an antenna transducer configured to selectively cancel far-field EM radiation from said first antenna element, one of said first antenna element and said second antenna element further configured to resonate at said at least one reading mode frequency band.

19. A multi-frequency RFID device according to claim 18, wherein said first antenna element comprises a driven element and a parasitic element separated from said driven element; and wherein said antenna transducer of said second antenna element is coupled to said parasitic element.

20. A multi-frequency RFID device according to claim 19, wherein said parasitic element comprises at least one element selected from a reflector element and a director element.

21. A multi-frequency RFID device according to claim 18, wherein said antenna transducer of said second antenna element comprises a first conductive current loop, said first conductive current loop encircles a perimeter of one of said at least one element of said parasitic element.

22. A multi-frequency RFID device according to claim 21, wherein said antenna transducer of said second antenna element further comprises a second conductive current loop spaced apart from said first conductive current loop, each of said first conductive current loop and said second conductive current loop encircles an axis of a largest dimension of said parasitic element.

23. A multi-frequency RFID device according to claim 22, wherein said first conductive current loop is substantially parallel to said second conductive current loop, said first conductive current loop and said second conductive current loop are configured to conduct current in a first direction.

24. A multi-frequency RFID device according to claim 21, wherein said antenna transducer of said second antenna element further comprises a second conductive current loop spaced apart from said first conductive current loop; and
    wherein said parasitic element comprises a first lobe and a second lobe spaced apart from said first lobe, said first conductive current loop encircling said first lobe, and said second conductive loop encircling said second lobe.

25. A multi-frequency RFID device according to claim 20, wherein one of said at least one element of said parasitic element is configured to resonate at a frequency of about 915 MHz and said second antenna element is configured to resonate at a frequency selected from about 125 kHz and about 13.56 MHz.

26. A multi-frequency RFID device according to claim 25, wherein one of said at least one element of said parasitic element is configured to resonate at a frequency selected from about 2.45 GHz and about 5.6 GHz.

27. A multi-frequency RFID device according to claim 18, wherein said first antenna element is further configured to radiate a directional pattern having substantially less than 180 degrees of directivity.

28. A multi-frequency interrogator antenna assembly comprising:
    an array of radiating elements, said array of radiating elements configured as one of parasitically-driven, partially all-driven, and all-driven and configured to selectively radiate electromagnetic (EM) radiation in at least one of a near-field and a far-field based on a frequency of a detected RFID tag; and
    a transducer configured to cancel said far-field EM radiation when selectively radiating in said near-field, the near-field EM radiation being one of about 135 kHz and about 13.56 MHz, and the far-field EM radiation being one of about 915 MHz, about 2.45 GHz, and about 5.6 GHz.

29. A multi-frequency interrogator antenna assembly according to claim 28, wherein said array of radiating elements comprises:
    a first radiating element configured to resonate at one of about 2.45 GHz and about 5.6 GHz;
    a second radiating element configured to resonate at one of about 135 kHz and about 13.56 MHz; and
    a third radiating element configured to resonate at about 915 MHz.

30. A multi-frequency interrogator antenna assembly according to claim 28, wherein each radiating element of said array of radiating elements is selected from a slotted antenna, a dipole element, a patch antenna element, and a monopole antenna element.

* * * * *